(12) United States Patent
Wigney

(10) Patent No.: US 12,429,431 B2
(45) Date of Patent: Sep. 30, 2025

(54) INSPECTION CAMERAS, SYSTEMS AND METHODS

(71) Applicant: Ferret Tools Limited, Auckland (NZ)

(72) Inventor: Andrew James Wigney, Auckland (NZ)

(73) Assignee: Ferret Tools Limited, Auckland (NZ)

( * ) Notice: Subject to any disclaimer, the term of this patent is extended or adjusted under 35 U.S.C. 154(b) by 381 days.

(21) Appl. No.: 18/070,136

(22) Filed: Nov. 28, 2022

(65) Prior Publication Data

US 2023/0168207 A1 Jun. 1, 2023

Related U.S. Application Data

(60) Provisional application No. 63/283,672, filed on Nov. 29, 2021.

(51) Int. Cl.
*G01N 21/88* (2006.01)
*H04N 23/51* (2023.01)

(52) U.S. Cl.
CPC ......... *G01N 21/8806* (2013.01); *H04N 23/51* (2023.01)

(58) Field of Classification Search
CPC .. F16L 2101/30; F16L 55/28; G01N 21/8806; G01N 21/954; G02B 23/2476; G03B 17/561; G03B 37/005; H04N 23/51; H04N 23/555
See application file for complete search history.

(56) References Cited

U.S. PATENT DOCUMENTS

| | | | | |
|---|---|---|---|---|
| 11,221,544 | B1* | 1/2022 | York | F16M 11/24 |
| 2012/0307039 | A1* | 12/2012 | Holmes | H04N 7/183 |
| | | | | 348/82 |
| 2015/0264825 | A1* | 9/2015 | Fuller | H04M 1/11 |
| | | | | 361/679.01 |
| 2016/0248962 | A1* | 8/2016 | Li | H04N 23/51 |
| 2021/0400175 | A1* | 12/2021 | Dunn | F16M 11/16 |
| 2022/0357637 | A1* | 11/2022 | Park | F16M 11/041 |

* cited by examiner

*Primary Examiner* — Amy R Hsu
(74) *Attorney, Agent, or Firm* — Nixon & Vanderhye P.C.

(57) ABSTRACT

An inspection camera system includes a camera unit and one or more accessory tools. The camera is mounted in a camera housing. A primary attachment and a secondary attachment act together to provide a reliable attachment of an accessory tool to the camera housing. The accessory tool is removable from the camera housing by disengagement of the secondary and primary attachments. The primary attachment arrangement alone, in an engaged position, resists at least some motion of the accessory tool relative to the camera housing. The secondary attachment arrangement, when engaged, resists motion of the primary attachment arrangement relative to the camera housing out of its engaged position.

20 Claims, 6 Drawing Sheets

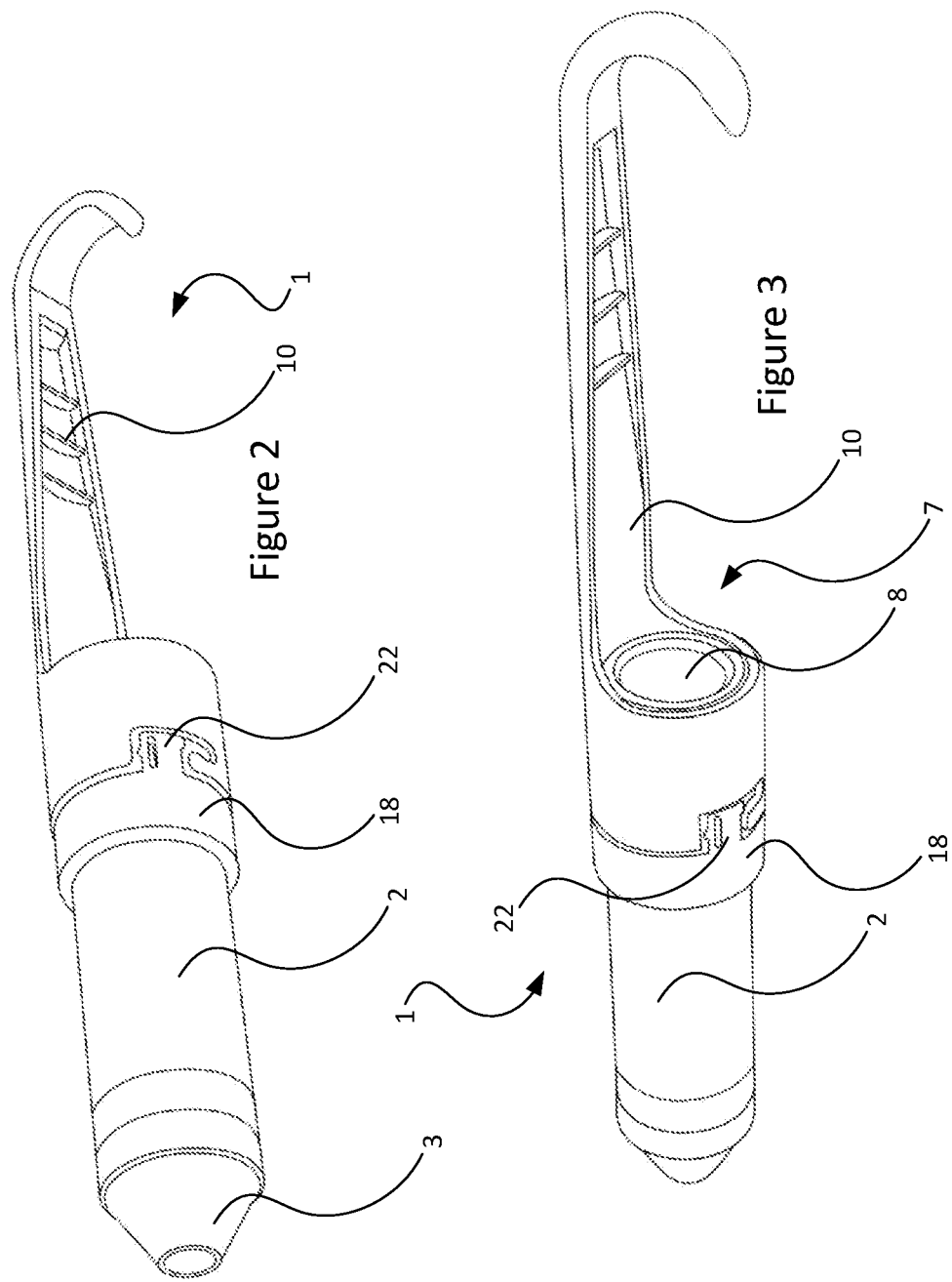

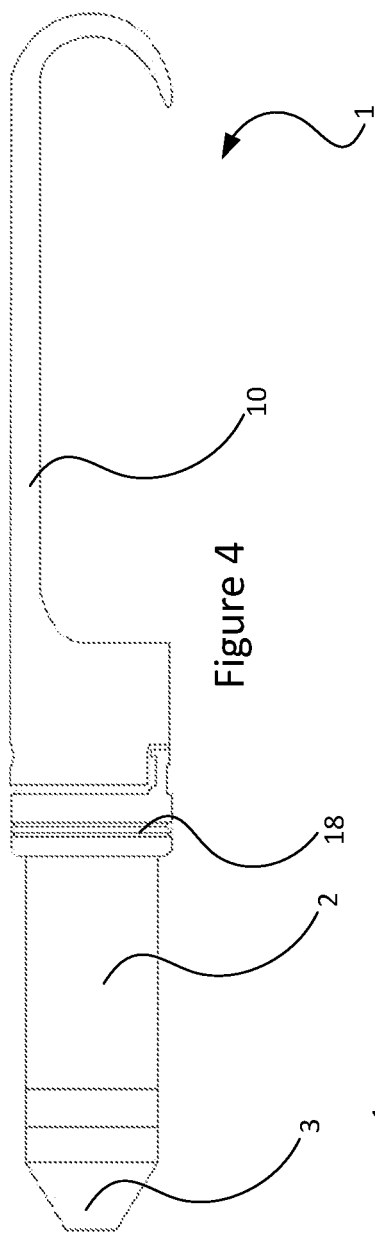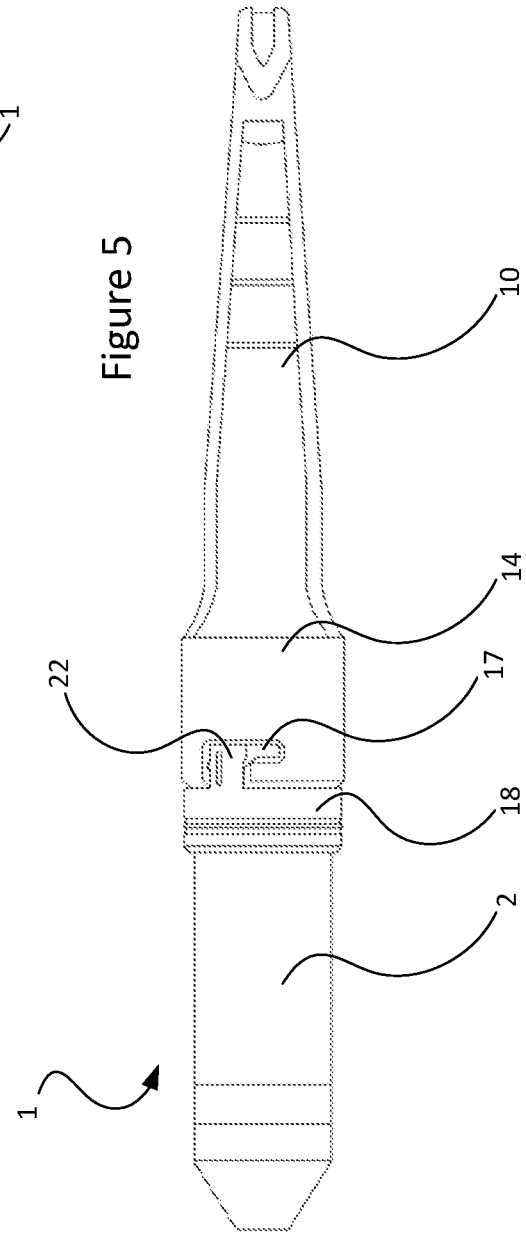

INSPECTION CAMERAS, SYSTEMS AND METHODS

This application claims priority to U.S. Provisional Application 63/283,672 filed Nov. 29, 2021, the entire contents of which is hereby incorporated by reference.

FIELD OF THE INVENTION

The invention relates to inspection cameras, in particular to inspection camera systems including a camera and a removable accessory tool.

BACKGROUND

Inspection cameras are used in various non-medical fields. Such cameras are also sometimes called borescope cameras. Medical endoscopes and the like are a separate field of technology and are considered outside the scope of this specification.

Inspection cameras are often used by tradespeople and others for inspecting difficult to reach or inaccessible areas. For example, plumbers, electricians, builders, home owners etc may use inspection cameras to inspect pipes, wiring or other building elements. Areas to be inspected may be positioned within walls, ceiling areas, behind fixed building elements etc.

Some existing inspection cameras provide accessories which can be attached to the camera. For example, some cameras allow the attachment of a mirror to redirect the camera view around a corner or obstacle. Others allow attachment of a hook or magnet for manipulation of objects. However, existing arrangements suffer from poor performance. Accessories are not well attached to the camera, perform poorly in manipulation of objects and can detach from the camera in use.

It would be desirable to provide an improved inspection camera, or at least to provide the public with a useful choice.

SUMMARY

An inspection camera system may include an inspection camera including a camera housing and an accessory tool configured to be removably attached to the camera housing. The attachment may be achieved by primary and secondary attachments. The primary attachment arrangement may, in an engaged position, resist at least some motion of the accessory tool relative to the camera housing. The secondary attachment arrangement may, when engaged, resist motion of the primary attachment arrangement relative to the camera housing out of the engaged position.

The primary attachment arrangement may, in the engaged position, resist at least axial motion of the accessory tool relative to the camera housing.

The accessory tool may be removed from the camera housing by disengaging the secondary attachment arrangement and the primary attachment arrangement.

The primary attachment arrangement may include a bayonet or twist lock mechanism. Alternatively, other attachment mechanisms may be used. In general, the primary attachment arrangement may include one or more first cooperating elements on the camera housing and one or more second cooperating elements on the accessory tool. Each first cooperating element may be a protrusion from the camera housing. Each second cooperating element may be a slot, groove or channel.

Where the second cooperating element is a slot, groove or channel, it may have a first axial portion and a second circumferential portion. In use, the accessory tool may be moved axially relative to the camera housing to move the protrusion along the axial portion and then rotated to move the protrusion along the circumferential portion to the engaged position. In the engaged position the protrusion and the circumferential portion may cooperate to resist further axial motion of the accessory tool relative to the camera housing.

The second attachment arrangement may include a locking element configured to engage between the axial portion and the protrusion to resist rotational motion of the accessory tool relative to the camera housing out of the engaged position.

One or more cooperating retaining elements may be arranged such that the primary attachment arrangement clicks into the engaged position.

The secondary attachment arrangement may include a locking element configured to engage with the camera housing and with the accessory tool to resist motion of the primary attachment arrangement relative to the camera housing out of the engaged position.

The locking element may include one or more retaining elements that engage with one or more of the camera housing and the accessory tool to retain the locking element in a locked position.

The camera housing may be elongate. The camera housing may be of generally cylindrical form. It may have a length 5 to 15 times its diameter. The camera housing may have a diameter in the range 10 to 50 mm (⅜ to 2"). The camera housing may have a length in the range 150 to 250 mm (6 to 10").

The accessory tool may be a hook tool. The accessory tool may be a magnet tool. The accessory tool may be a mirror tool. Different accessory tools may be used interchangeably and may be used or supplied in a kit.

The accessory tool, when attached to the camera housing by the primary and secondary attachment arrangements, may be positioned within a field of view of the inspection camera.

The accessory tool may include: an attachment portion including at least part of the primary attachment arrangement; a tool portion; and an arm extending between the attachment portion and the tool portion.

A method of removably attaching an accessory tool to an inspection camera may include moving the accessory tool relative to a camera housing to move a first attachment arrangement into an engaged position. In the engaged position the first attachment arrangement may resist at least some motion of the accessory tool relative to the camera housing. A locking element may be moved such that it engages between the camera housing and the accessory tool to resist motion of the accessory tool relative to the camera housing out of the engaged position.

BRIEF DESCRIPTION OF DRAWINGS

The invention will be described by way of example only, with reference to the accompanying drawings, in which:

FIGS. 2 to 6 are further views of the inspection camera system of FIG. 1, showing an accessory tool attached to a camera housing;

DESCRIPTION OF PREFERRED EMBODIMENTS

FIGS. 1 to 7F illustrate an inspection camera system 1 according to one embodiment.

Figure 1:
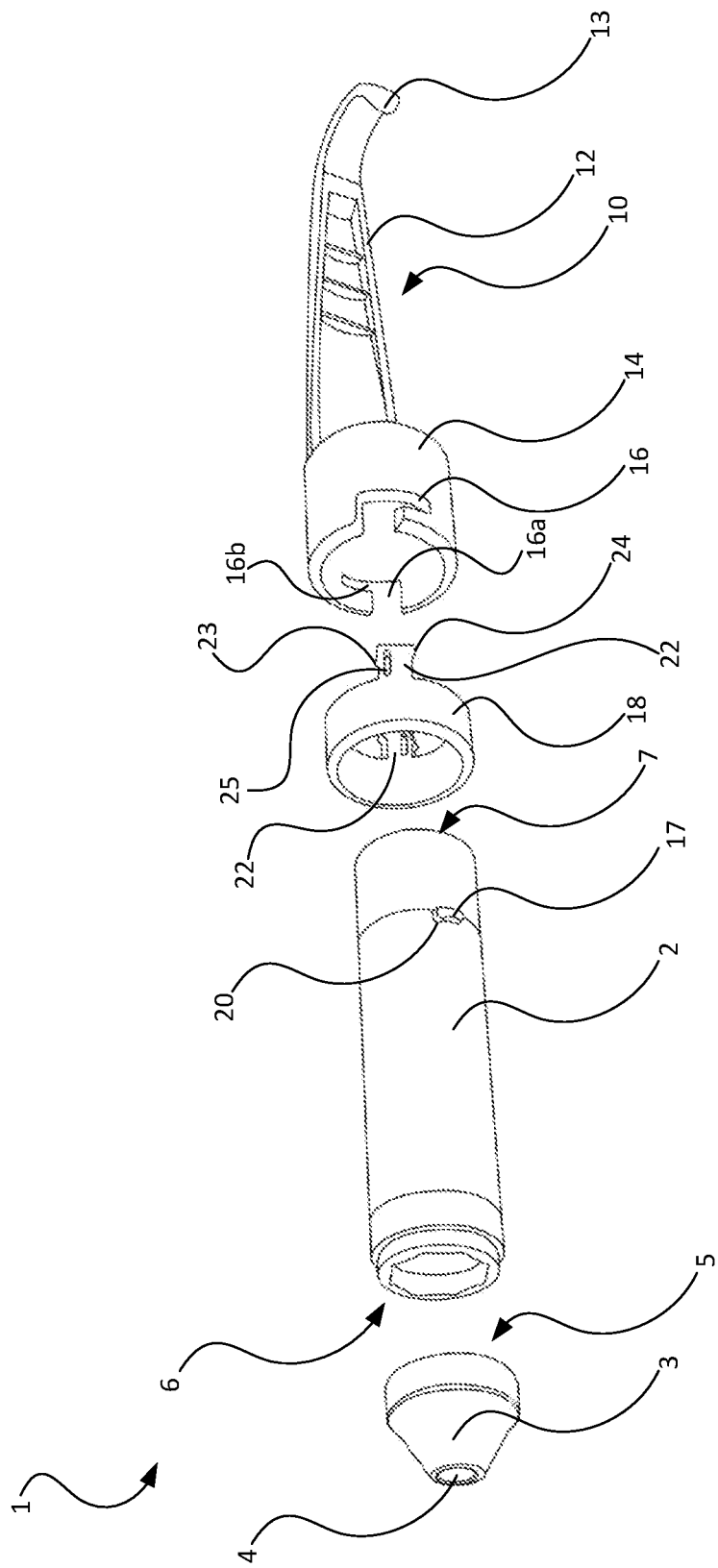
FIG. 1 is an exploded view of an inspection camera system according to one embodiment.

Referring to the exploded view of FIG. 1, a camera housing 2 may be of generally elongate, 'bullet' or cylindrical form. This shape is suited to introduction of the camera into inaccessible areas. In some embodiments, the camera housing may have a length between 150 and 250 mm (or 6 to 10"), preferably between 175 to 200 mm (or 7 to 8"). In some embodiments, the camera housing may have a diameter between 10 and 50 mm (or ⅜ to 2"), preferably around 15 to 25 mm (or ⅝ to 1"). In some embodiments, the ratio of length to diameter of the camera housing may be between 5:1 and 15:1, preferably between 7:1 and 12:1.

An end cap 3 may be provided with a formation 4 for connection of a rod or the like (not shown) to allow the camera to be introduced into an area to be inspected. The rod may be flexible or inflexible and the manner of use is well known in the field of inspection cameras. Cooperating features 5, 6 (e.g. screw threads, a bayonet fitting or a permanent connection) are provided for attachment of the end cap 3 to the camera housing 2.

At the other end 7 of the camera housing 2, a camera unit 8 (FIG. 2) is provided, including e.g. a camera sensor, one or more lenses, lighting devices etc. The camera field of view extends to the right as shown in FIG. 1. The camera may also include any one or more of: a communication interface (wired or wireless interface of any suitable kind, e.g. a built in Wi-Fi hotspot interface, Bluetooth interface), battery, power connector (e.g. a USB or other power socket), a charging indicator (e.g. LED).

The image captured by the camera unit 8 may be communicated via the communication interface to an external device, such as a user's Smartphone, tablet, computer or other display device. Preferably video is displayed in real time. This allows a user to view the image on the external device while manipulating the camera unit. Alternatively or additionally, video and/or still images may be captured and stored.

The camera unit may be used on its own as an inspection camera. However, an accessory tool 10 may also be attached to the camera housing 2. In FIGS. 1 to 5 and 7A-7F the accessory tool 10 is a hook tool. The hook tool may be visible in the camera field of view. This allows a user to view the hook position on the external device while manipulating the position of the camera housing and hook tool. Once the hook tool is positioned correctly, the user can manipulate the camera housing and accessory tool to exert a force via the tool. The use of a hook tool 10 therefore allows the camera system to be used in pulling on an object, including e.g. a cable, wire, line, wire, string or the like. However, the hook tool can be used in to pull or push in any direction, due to its robust attachment to the camera housing, discussed below. Tools may be used to push an object aside—e.g. insulation.

Other accessory tools, including mirror tools and magnet tools may also be used. Tools may be changed, and a set of tools may be provided in a kit or system for use with a single camera unit.

The hook tool 10 may include an arm portion 12 extending between a hook portion 13 and an attachment portion 14. In the embodiment shown, the attachment portion 14 includes a generally cylindrical section configured to fit over the outside of the camera housing, as will become apparent below.

The attachment mechanism will be discussed further with reference to FIGS. 1 and 7A to F. One or more formations or features 16 on the attachment portion may interact with formations or features 17 on the camera housing to form a primary attachment of the accessory tool 10 to the camera housing 2.

In the embodiment of FIG. 1, the formations 16 may each include a slot having a first, axial portion 16a that extends parallel to the length of the camera housing and a second circumferential portion 16b that extends from the axial portion around the circumference of the attachment portion 14. The formations 17 may each include a protrusion configured to engage with the slot as follows.

To attach the accessory tool to the camera housing, the accessory tool may be moved axially with respect to the camera housing from the position shown in FIG. 7A to that of FIG. 7B. The attachment portion 14 may move over the end 7 of the camera housing 2, and the protrusion 17 may move along the axial portion 16a of the slot 16.

From the position of FIG. 7B, the accessory tool 10 may then be rotated with respect to the camera housing to the position of FIG. 7C. This moves the protrusion 17 along the circumferential portion 16b. In this engaged position or state, the cooperation of the protrusion 17 and the circumferential portion 16b of the slot 16 resists further axial motion of the accessory tool relative to the camera housing. However, a twisting action could still result in detachment of the accessory tool from the camera housing.

In the engaged position, a lug or other feature 20 on the protrusion 17 may press against a wall of the slot 16, or may engage with a small recess or other feature on the slot wall. This tends to retain the accessory tool 10 in the engaged position of FIG. 7C. In some embodiments, the feature 20 and cooperating feature on the attachment portion 14 may cause the accessory tool 10 to 'click' into the engaged position. This retention or 'click' mechanism provides a positive positioning of the primary attachment in the engaged position as an aid to the user, but may not be strong enough to resist detachment of the accessory tool in use. Other arrangements of cooperating features between the camera housing and accessory tool may be used to provide this retention and/or 'click-into-place' mechanism.

With the primary attachment arrangement in this engaged position, a secondary attachment may be formed by engagement of a further locking element 18. FIGS. 7D and E show a locking element 18 being moved over the camera housing towards the attachment portion 14. In the embodiment shown, the locking element 18 includes tabs 22 which may be configured to engage with the axial portions 16a of slots 16, as shown in FIG. 7F. In this position, each tab 22 on the locking element 18 acts between the protrusion 17 on the camera housing and a wall of the corresponding slot 16 to resist movement of the accessory tool out of the engaged position. In other words, this secondary attachment resists release of the primary attachment.

Further, each tab 22 may include a first lug or raised section 23 configured to act against the slot 16 and a further lug or raised section 24 configured to act against the protrusion 17. The first lug 23 may cooperate with a recess 23' (FIGS. 7C-7F). The second lug 24 may cooperate with an edge 24' of the slot 16. This may tend to retain the locking element 18 in its engaged position. Further, the locking element 18 may click into the engaged position. Other arrangements of cooperating features between the locking element and either or both of the camera housing and accessory tool may be used to provide this retention and/or 'click-into-place' mechanism.

The accessory tool may be detached from the camera housing by reversing the steps of FIGS. 7A-7F.

In the embodiment shown, a cut-out or slot/slit 25 (FIG. 1) or other weakness may form a spring near the first lug 23. The lug 23 presses onto the surface of the hook and flexes slightly to reduce the size of the slot/slit. This creates pressure to hold the tab (and therefore the locking element) in place. It also means the removal is easy for the camera user.

Alternatively, cooperating features may be provided on the locking element 18 and the camera housing 2 to retain the locking element in its engaged position.

FIGS. 2 to 5 show various views of the accessory tool 10 attached to the camera housing 2, with both the primary and secondary attachments having been made.

Figure 6:
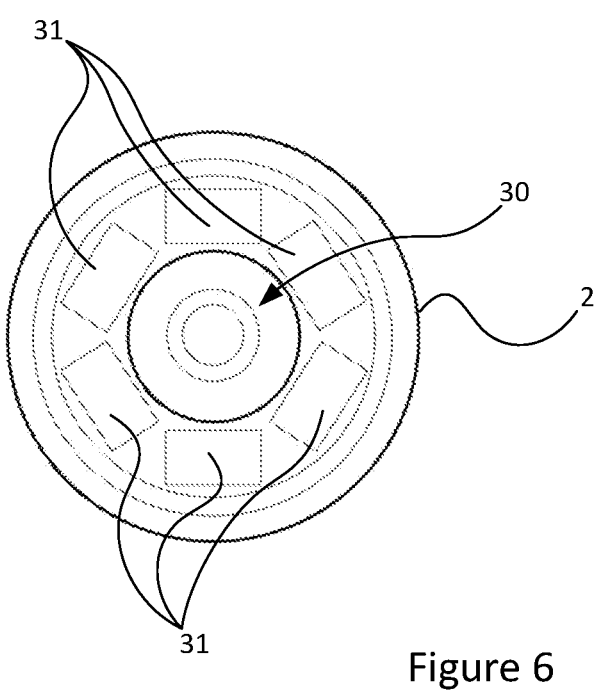
Figure 7:
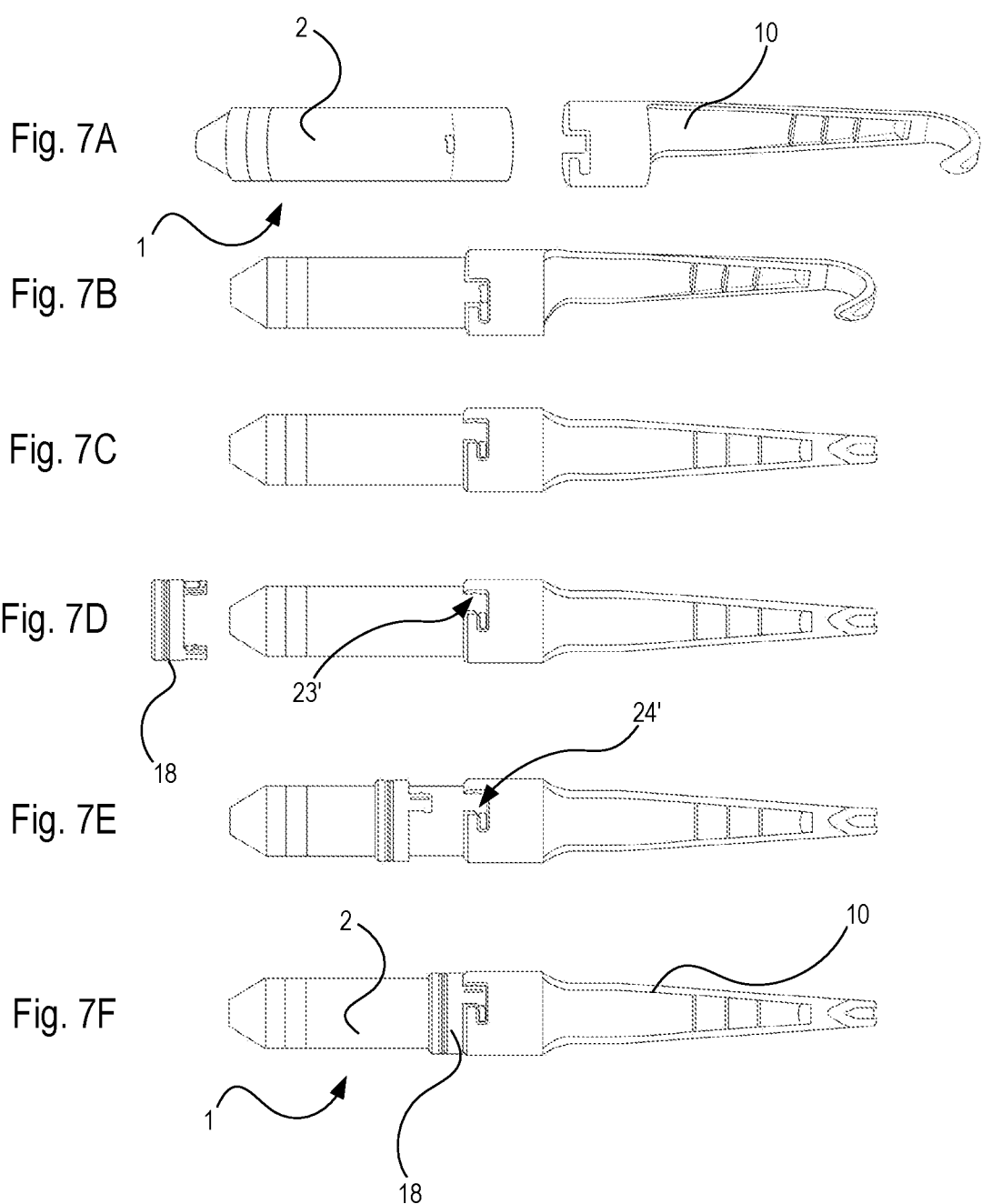
FIGS. 7A-F illustrate attachment of an accessory tool to a camera housing, in the inspection camera system of FIG. 1.

FIG. 6 is a view of the end 7 of the camera unit, showing the camera lens 30 and a number of lighting devices 31 (e.g. LED lighting devices).

While FIGS. 1 to 7F show the primary attachment including an open slot 17, the skilled reader will understand that this formation could be a groove, channel or other feature. The groove or channel need not pass entirely through the material of the attachment portion 14. For example, a groove or channel could be formed on an internal surface of the attachment portion 14 without penetrating to the outside of the attachment portion.

Figure 8:
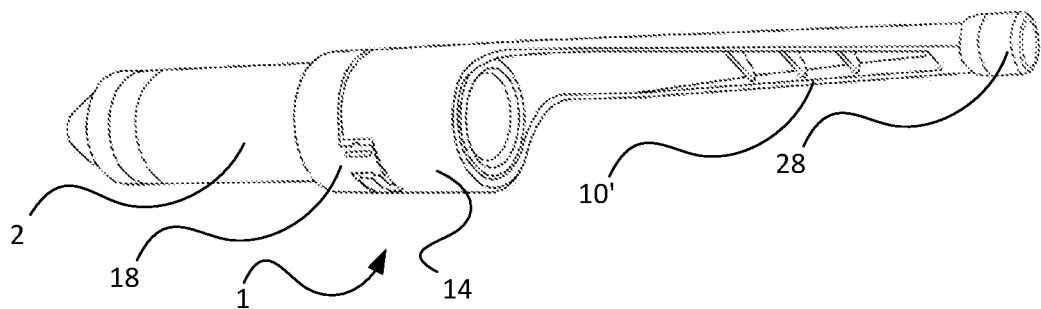
FIG. 8 shows an alternative accessory tool attached to a camera housing.

FIG. 8 shows an alternative accessory tool 10' attached to a camera housing 2. The accessory tool 10' includes an attachment portion 14 similar to that disclosed above. At the end of an arm portion, a magnet 28 may be mounted.

Figure 9:
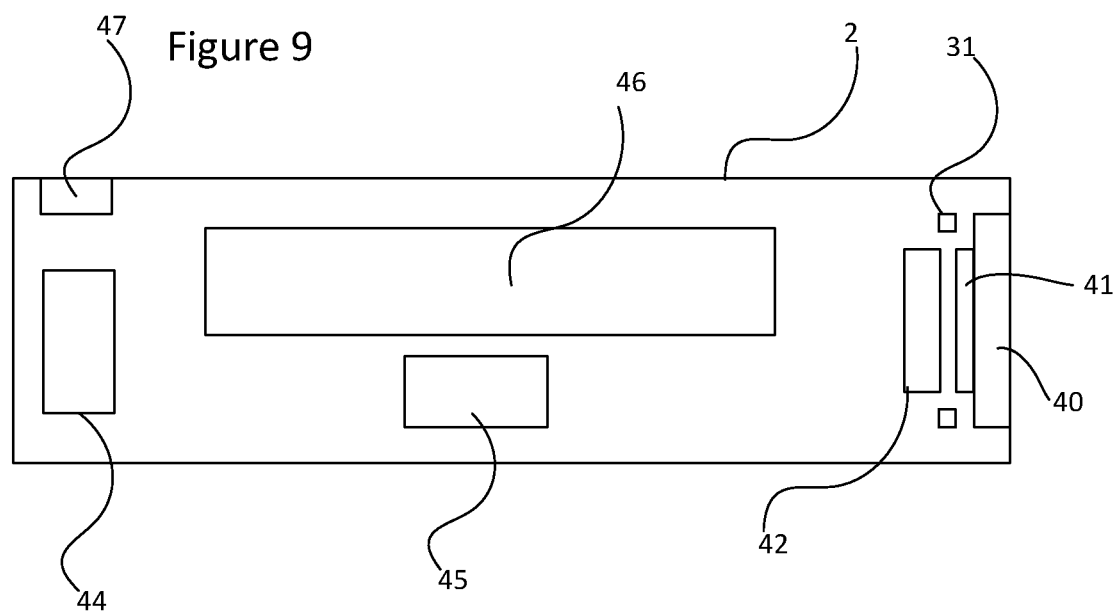
FIG. 9 is a schematic diagram illustrating components of one embodiment of camera unit.

FIG. 9 is a schematic diagram illustrating the components of one embodiment of camera unit. This diagram is not intended to be to scale, or to show a particular layout or connections between components. Within the camera housing 2, an optical window 40 may allow light to pass through a lens 41 to a camera sensor 42. Lighting devices 31 may be arranged to emit light through the optical window. The camera unit may also include a communications interface 44, processor 45, battery 46 and charging port 47. Any other desired or suitable components may be included. Further, the camera unit may include one or more wired connections, for data and/or power. In such cases the camera may not include a battery or charging port.

The Applicant's arrangement ensures that the accessory tool is firmly attached to the camera housing and significant forces in any direction can be exerted through the tool without danger of detachment from the camera housing. However, the accessory tool is easily removed such that a different tool can be attached, or the camera used without any tool.

Further, the above arrangement can be formed in the camera housing and accessory tool by cost effective manufacturing processes. In some embodiments the camera housing, accessory tool and locking element may be formed from suitable moulded plastic materials, with the features of the primary and secondary attachment arrangements being formed during the moulding process.

In this specification, the term 'axial' refers to a direction along or parallel to the length of the camera housing, or along or parallel to the camera's optical axis.

In this specification, the term 'circumferential' refers to a feature or motion along the circumference of a circle or cylinder.

It will be appreciated by those skilled in the art that the above-described camera, camera system and methods of use may be straightforwardly adapted or extended in various ways. For example, various accessory tools may be used. Further, a kit of a camera unit with two or more interchangeable accessory tools may be used. Various mechanical arrangements, including alternative bayonet or twist lock fittings, alternative forms of cooperating features etc, screw threads etc, may be used to provide the primary and/or secondary attachments.

In the specific embodiment described above the primary attachment may resist axial motion and the secondary attachment may resist rotational motion. However, the skilled reader will understand that other arrangements are possible. In general, the primary attachment may resist at least some motion of the accessory tool relative to the camera housing, while the secondary attachment resists disengagement of the primary attachment. The effect of the primary and secondary attachments acting together may resist all movement of the accessory tool relative to the camera housing.

While the present invention has been illustrated by the description of the embodiments thereof, and while the embodiments have been described in detail, it is not the intention of the Applicant to restrict or in any way limit the scope of the appended claims to such detail. Further, the above embodiments may be implemented individually, or may be combined where compatible. Additional advantages and modifications, including combinations of the above embodiments, will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

The invention claimed is:

1. An inspection camera system including:
   an inspection camera including a camera housing; and
   an accessory tool configured to be removably attached to the camera housing by:
   a primary attachment arrangement configured to couple to a first end of the camera housing, such that, in an engaged position, resists at least some motion of the accessory tool relative to the camera housing; and
   a secondary attachment configured to move over a second end of the camera housing to engage with primary attachment arrangement, such that, when engaged, the secondary attachment resists motion of the primary attachment arrangement relative to the camera housing out of the engaged position.

2. An inspection camera system as claimed in claim 1 wherein the primary attachment arrangement, in the engaged position, resists at least axial motion of the accessory tool relative to the camera housing.

3. An inspection camera system as claimed in claim 1 wherein the accessory tool is configured to be removed from the camera housing by disengaging the secondary attachment arrangement and then the primary attachment arrangement.

4. An inspection camera system as claimed in claim 1 wherein the primary attachment arrangement includes a bayonet or twist lock mechanism.

5. An inspection camera system as claimed in claim 1 wherein the primary attachment arrangement includes one or more first cooperating elements on the camera housing and one or more second cooperating elements on the accessory tool.

6. An inspection camera system as claimed in claim 5 wherein:
   a. each first cooperating element is a protrusion from the camera housing, and
   b. each second cooperating element is a slot, groove or channel having a first axial portion and a second circumferential portion,
   such that, in use, an accessory tool may be moved axially relative to the camera housing to move the protrusion along the axial portion and then rotated to move the protrusion along the circumferential portion to the engaged position, in which the protrusion and the circumferential portion cooperate to resist further axial motion of the accessory tool relative to the camera housing.

7. An inspection camera system as claimed in claim 6 wherein the second attachment arrangement includes a locking element configured to engage between the axial portion and the protrusion to resist rotational motion of the accessory tool relative to the camera housing out of the engaged position.

8. An inspection camera system as claimed in claim 1 including one or more cooperating retaining elements arranged such that the primary attachment arrangement clicks into the engaged position.

9. An inspection camera system as claimed in claim 1 wherein the secondary attachment arrangement includes a locking element configured to engage with the camera housing and with the accessory tool to resist motion of the primary attachment arrangement relative to the camera housing out of the engaged position.

10. An inspection camera system as claimed in claim 9 wherein the locking element includes one or more retaining elements that engage with one or more of the camera housing and the accessory tool to retain the locking element in a locked position.

11. An inspection camera system as claimed in claim 1 wherein the camera housing is elongate and dimensioned to be inserted into an at least partially closed inspection space.

12. An inspection camera system as claimed in claim 11 wherein the camera housing is of generally cylindrical form and has a length 5 to 15 times its diameter.

13. An inspection camera system as claimed in claim 12 wherein the camera housing has a diameter in the range 10 to 50 mm.

14. An inspection camera system as claimed in claim 12 wherein the camera housing has a length in the range 150 to 250 mm.

15. An inspection camera system as claimed in claim 1 wherein the accessory tool is a hook tool.

16. An inspection camera system as claimed in claim 1 wherein the accessory tool is a magnet tool.

17. An inspection camera system as claimed in claim 1 wherein the accessory tool is a mirror tool.

18. An inspection camera system as claimed in claim 1 wherein the accessory tool, when attached to the camera housing by the primary and secondary attachment arrangements, is positioned within a field of view of the inspection camera.

19. An inspection camera system as claimed in claim 1 wherein the accessory tool includes:
   a. an attachment portion including at least part of the primary attachment arrangement;
   b. a tool portion; and
   c. an arm extending between the attachment portion and the tool portion.

20. A method of removably attaching an accessory tool to an inspection camera, including:
   a. moving an accessory tool relative to a camera housing to move a first attachment arrangement into an engaged position with a first end of the camera housing, such that the first attachment arrangement resists at least some motion of the accessory tool relative to the camera housing; and
   b. moving a locking element over second end of the camera housing such that it engages between the camera housing and the accessory tool to resist motion of the accessory tool relative to the camera housing out of the engaged position.

* * * * *